(12) United States Patent
Hayashi et al.

(10) Patent No.: US 9,777,739 B2
(45) Date of Patent: Oct. 3, 2017

(54) ROTATION SHAFT SUPPORTING STRUCTURE FOR ELECTRIC SUPERCHARGER

(75) Inventors: Noriyuki Hayashi, Tokyo (JP); Yukio Yamashita, Tokyo (JP); Byeongil An, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 81 days.

(21) Appl. No.: 13/807,568

(22) PCT Filed: Oct. 14, 2011

(86) PCT No.: PCT/JP2011/073705
§ 371 (c)(1),
(2), (4) Date: Mar. 4, 2013

(87) PCT Pub. No.: WO2012/063603
PCT Pub. Date: May 18, 2012

(65) Prior Publication Data
US 2013/0220285 A1     Aug. 29, 2013

(30) Foreign Application Priority Data

Nov. 12, 2010   (JP) .................................. 2010-253787

(51) Int. Cl.
*F04D 29/057* (2006.01)
*F04D 29/063* (2006.01)
(Continued)

(52) U.S. Cl.
CPC ............ *F04D 29/057* (2013.01); *F02B 37/10* (2013.01); *F02B 39/10* (2013.01); *F04D 25/06* (2013.01);
(Continued)

(58) Field of Classification Search
CPC ........ F04D 25/08; F04D 25/06; F04D 29/057; F04D 29/047; F04D 29/063; F16C 17/02; F16C 33/1045
See application file for complete search history.

(56) References Cited

U.S. PATENT DOCUMENTS 2,888,193 A  *  5/1959  Greenwald ................... 417/370
3,433,164 A  *  3/1969  Neal ........................ 417/423.12
(Continued)

FOREIGN PATENT DOCUMENTS

| CN | 1555461 A | 12/2004 |
|---|---|---|
| CN | 1912364 A | 2/2007 |

(Continued)

OTHER PUBLICATIONS

English Machine Translation of JP 2007-071165 A.
(Continued)

*Primary Examiner* — Bryan Lettman
(74) *Attorney, Agent, or Firm* — Birch, Stewart, Kolasch & Birch, LLP

(57) ABSTRACT

A rotation shaft supporting structure for an electric supercharger includes a rotation shaft that supports a compressor wheel, an electric motor including a motor rotator securely installed to the rotation shaft, and a stator for applying torque to the motor rotator. The supporting structure further includes a bearing provided on a bearing side end of the rotation shaft, which is adjacent to the compressor wheel, to support the rotation shaft, and a damper unit for absorbing shaft vibration of the rotation shaft. The compressor wheel is a wheel of a supercharging side, and the damper unit is provided at a shaft end on an opposite side to the bearing side.

2 Claims, 4 Drawing Sheets

(51) Int. Cl.
- *F04D 25/08* (2006.01)
- *F04D 29/047* (2006.01)
- *F16C 33/10* (2006.01)
- *F04D 25/06* (2006.01)
- *F16C 17/02* (2006.01)
- *F02B 37/10* (2006.01)
- *F02B 39/10* (2006.01)
- *F16C 27/02* (2006.01)

(52) U.S. Cl.
CPC .......... *F04D 25/08* (2013.01); *F04D 29/047* (2013.01); *F04D 29/063* (2013.01); *F16C 17/02* (2013.01); *F16C 27/02* (2013.01); *F16C 33/1045* (2013.01); *F16C 2360/44* (2013.01); *Y02T 10/144* (2013.01)

(56) References Cited

U.S. PATENT DOCUMENTS

| | | | | |
|---|---|---|---|---|
| 3,853,433 | A * | 12/1974 | Roberts et al. | 417/423.13 |
| 3,907,054 | A * | 9/1975 | Lavish | F16C 17/02 |
| | | | | 180/9.6 |
| 4,669,893 | A * | 6/1987 | Chalaire | F16C 27/045 |
| | | | | 384/535 |
| 4,674,952 | A * | 6/1987 | Osterstrom | 415/170.1 |
| 4,767,265 | A * | 8/1988 | Osterstom | 415/229 |
| 4,782,919 | A * | 11/1988 | Chalaire | F16C 27/045 |
| | | | | 184/6.11 |
| 4,867,655 | A * | 9/1989 | Barbic | F16C 27/045 |
| | | | | 384/535 |
| 4,963,076 | A * | 10/1990 | Fleischmann et al. | 417/423.7 |
| 5,114,320 | A * | 5/1992 | Kabelitz et al. | 417/423.13 |
| 5,201,585 | A * | 4/1993 | Gans | F01D 25/164 |
| | | | | 384/215 |
| 5,215,384 | A * | 6/1993 | Maier | F16C 27/02 |
| | | | | 384/117 |
| 5,228,784 | A * | 7/1993 | Bobo | F16C 27/045 |
| | | | | 384/487 |
| 6,449,950 | B1 | 9/2002 | Allen et al. | |
| 6,591,612 | B2 * | 7/2003 | Bolz et al. | 60/608 |
| 6,939,115 | B2 * | 9/2005 | Knoll et al. | 417/423.12 |
| 7,382,061 | B2 * | 6/2008 | Ferraro | 290/52 |
| 7,425,119 | B2 * | 9/2008 | Bolz | 417/366 |
| 7,625,121 | B2 * | 12/2009 | Pettinato | F16C 17/03 |
| | | | | 384/117 |
| 7,950,906 | B2 * | 5/2011 | Hall, Jr. | E21B 4/003 |
| | | | | 384/476 |
| 8,453,665 | B2 * | 6/2013 | Braun | F16C 17/02 |
| | | | | 137/1 |
| 9,068,593 | B2 * | 6/2015 | Gloeckner | F16C 27/045 |
| 9,222,511 | B2 * | 12/2015 | Lee | F16C 33/103 |
| 2007/0108772 | A1 | 5/2007 | Shibui et al. | |
| 2007/0154124 | A1 | 7/2007 | Inoue et al. | |
| 2007/0223852 | A1 * | 9/2007 | Lee | F16C 33/043 |
| | | | | 384/297 |
| 2010/0111681 | A1 * | 5/2010 | Nakano | F01D 25/16 |
| | | | | 415/180 |
| 2011/0311350 | A1 * | 12/2011 | Takahashi et al. | 415/170.1 |

FOREIGN PATENT DOCUMENTS

| | | |
|---|---|---|
| CN | 1928334 A | 3/2007 |
| CN | 1928335 A | 3/2007 |
| CN | 101160462 A | 4/2008 |
| EP | 1 762 713 A2 | 3/2007 |
| EP | 1762713 A2 | 3/2007 |
| JP | 7-109902 A | 4/1995 |
| JP | 2002-213450 A | 7/2002 |
| JP | 2002-369474 A | 12/2002 |
| JP | 2005-163643 A | 6/2005 |
| JP | 2005-233249 A | 9/2005 |
| JP | 2006-9685 A | 1/2006 |
| JP | 2007-71165 A | 1/2006 |
| JP | 2007-309101 A | 11/2007 |
| JP | 2008-190680 A | 8/2008 |
| WO | WO 2006/112372 A1 | 10/2006 |

OTHER PUBLICATIONS

Office Action dated Nov. 5, 2013 for corresponding JP Application No. 2010-253787 with English translation.

Decision to Grant a Patent effective Mar. 13, 2014 issued in corresponding Japanese Application No. JP 2010-253787 with an English translation.

Chinese Office Action and Search Report, dated Jan. 21, 2015, for Chinese Application No. 201180032014.6, including an English translation thereof.

Chinese Notice of Allowance, dated May 4, 2016, for Chinese Application No. 201180032014.6, together with an English translation thereof.

* cited by examiner

ROTATION SHAFT SUPPORTING STRUCTURE FOR ELECTRIC SUPERCHARGER

TECHNICAL FIELD

The present invention relates to a rotation shaft supporting structure for an electric supercharger.

BACKGROUND ART

In an engine used for an automobile or the like, supercharging is performed by a supercharger to improve output of the engine. The supercharging of the air includes compressing the air by a compressor and then supplying the compressed air to the engine.

There are different types of superchargers, such as an exhaust gas turbine supercharger called as a turbocharger, and a mechanical supercharger which is mechanically powered and called as a mechanical supercharger. The turbocharger rotates the turbine using energy of the exhaust gas from the engine and compresses the intake air in a compressor directly coupled to the turbine to supply the compressed air to the engine.

Herein, the turbocharger uses the exhaust gas of the engine and thus may not be able to perform the supercharging sufficiently depending on a condition of the exhaust gas such as when the rotation speed of the engine is low. Therefore, as a measure against insufficient supercharging, an electric supercharger is known, in which an electric motor is provided so as to rotate the compressor by both the exhaust gas energy and the electric motor or solely by the electric motor.

To reduce the size of the electric supercharger, it is preferable to arrange the electric motor outside of a bearing for supporting the rotation shaft on the compressor side. The electric supercharger rotates the compressor using the electric motor. However, this causes the rotation shaft to rotate at a high speed and thus, it is necessary to provide a measure for reducing the shaft vibration.

FIG. 7 is a schematic view of a shaft supporting structure of a conventional electric supercharger.

In the shaft supporting structure of the conventional electric supercharger 101 shown in FIG. 7, a rotation shaft 102 extends outside a compressor wheel 104 attached to the rotation shaft 102. A compressor cover 106 covers components such as the compressor wheel 104.

On an extending part of the rotation shaft 102 extending outside the compressor wheel 104, a motor rotator 108 and a motor 110 are provided.

The motor rotator 108 is a rotator of the electric supercharger, which is fixed to the rotation shaft 102 to rotate with the rotation shaft 102. The motor 110 is a stator provided opposing the motor rotator in a direction perpendicular to the rotation shaft 102. Thus the motor 110 surrounds the motor rotator 108 and applies a rotation force to the motor rotator 108. The electric motor 107 is formed by the motor rotator 108 and the motor 110.

Bearings 112 are provided on both sides of the electric motor 107, i.e. on both sides of the motor rotator 108. By providing the bearings 112 in this manner, the extending part of the rotation shaft 102 has its center of gravity between the bearings 112. This structure allows the heavy motor rotator 108 to be supported at both ends thereof. Further, bearing housings 114 are provided for each covering the bearing 112. The bearings housing 114 is configured to supply oil to an interior of the bearing housing 114 and to drain the oil to an exterior of the bearing housing 114.

The shaft supporting structure for the electric supercharger shown in FIG. 7 supports the heavy motor rotator 108 at both ends thereof. This has a beneficial effect on reducing shaft vibration of the electric supercharger. However, this requires bearings 112 on both sides of the motor rotator 108, which leaves issues such as ease of assembling and a precision of centering the bearing housings.

In view of this, there is another shaft supporting structure which has an advantage as far as the ease of assembling and the precision of centering the bearing housings.

FIG. 8 is a schematic view of another shaft supporting structure of a conventional electric supercharger.

The same reference numerals are given in FIG. 8 without adding explanations for those configurations that are the same as those in FIG. 7.

In the shaft supporting structure for the electric supercharger shown in FIG. 8, the motor rotator 108 is supported by the bearing 112*b* on one end such that the motor rotator 108 overhangs from the bearing 112*b*.

The shaft supporting structure for the electric supercharger shown in FIG. 8 has the motor rotator 108 overhanging from the bearing (the bearing 112*b*). This structure is advantageous in the ease of assembling and in the precision of centering the bearing housings. However, there is still an issue in the shaft vibration reduction. Especially in the attempt of increasing the output of the compressor (increasing the capacity of the supercharger), the weight of the motor rotator increases. Thus the measure for reducing the shaft vibration is desired.

Patent Literature 1 discloses to devise a shape of the bearing so as to reduce the shaft vibration in the shaft supporting structure for the electric supercharger whose motor rotator overhangs from the bearing.

CITATION LIST

Patent Literature

[PTL 1]
JP 2007-71165 A

SUMMARY

Technical Problem

However, according to the technique disclosed in Patent Literature 1, the bearing is required to have particular shapes. This increases the cost of producing the bearing with the particular shape and also makes it difficult to apply the technique simply by altering existing devices.

In view of the above issues, it is an object of the present invention, in the shaft supporting structure of the shaft supporting structure for the electric supercharger having the electric motor overhanging outside the bearing, to provide a shaft supporting structure for the electric supercharger, which is easy to assembly and capable of reducing the shaft vibration and which does not require bearings of particular configurations and thus can be easily achieved by altering the existing devices.

Solution to Problem

To solve the above issues, according to the present invention, a rotation shaft supporting structure for an electric supercharger, comprises:

a rotation shaft to which a compressor wheel is attached, the compressor wheel being a wheel of a supercharging side;

an electric motor comprising a motor rotator securely installed to the rotation shaft, and a stator for applying torque to the motor rotator;

a bearing for supporting the rotation shaft, the bearing being provided on a bearing side closer to the compressor wheel than the motor rotator; and a damper unit for absorbing shaft vibration of the rotation shaft, the damper unit being provided at a shaft end on an opposite side to the bearing side.

As a result, the rotation shaft supporting structure for the electric supercharger is configured such that the motor rotator overhangs from the bearing and thus the ease of assembling is excellent. Further, the damper unit for absorbing the shaft vibration of the rotation shaft is provided and thus the shaft vibration can suppressed. Furthermore, the embodiments of the present invention are achievable by providing the damper unit at the end of the rotation shaft without using parts of special specifications and thus the embodiments cab be achieved by altering the existing devices.

Further, the damper unit may comprise:

a roller bearing provided around the rotation shaft;

a damper provided around an outer periphery of the roller bearing; and a ring-shaped member provided around an outer periphery of the damper.

As a result, the damper unit is configured with simple parts and thus, the present invention is achievable at low cost and in a simple manner.

Furthermore, the roller bearing may include a grease-filled roller bearing that is filled with grease.

In the case of not using the greased-filled roller bearing as the roller bearing, lubricating oil is supplied to the roller bearing, which requires a piping structure for supplying the lubricating oil. Therefore, the grease-filled roller bearing is used as the roller bearing so that a piping structure for supplying the lubricating oil and its related structures are no longer needed and thus, the overall size of the rotation shaft supporting structure can be reduced.

The damper unit may comprise:

a bush provided around the rotation shaft with a space between the bush and the rotation shaft;

a damper provided around an outer periphery of the bush; and a ring-shaped member provided around an outer periphery of the damper, and wherein the bush has an oil supply hole for supplying lubricating oil to the space from outside of the bush.

As a result, with use of the bush, equipments such as a piping for supplying the oil is needed but the damper unit overall can be reduced in size and the overall size of the rotation shaft supporting structure for the electric supercharger is reduced can be reduced as well. Further, the damper and the bearing have similar arrangement with respect to the rotation shaft but the damper may have a greater space between the damper and the rotation shaft than the bearing so as to be specialized in damping characteristics. Therefore, ease of assembly is improved compared to the case where the motor rotator is supported by two bearings.

The damper unit may comprise:

a bush provided around the rotation shaft with a space between the bush and the rotation shaft;

a ring-shaped member provided around the bush with a space between the ring-shaped member and the bush, the ring-shaped member having a wall surface facing a side surface of the bush on the motor rotator side; and a biasing member for biasing the bush against the wall surface, and wherein the bush has an oil supply hole for supplying lubricating oil to a space between the bush and the rotation shaft from outside of the bush.

As a result, a friction damper is formed for absorbing the shaft vibration of the rotation shaft with a frictional force between the bush and the wall surface. With use of the friction damper, the damping effect is improved. Further, the bush is prevented from moving in the thrust direction by a simple structure using the biasing member and the wall surface.

Further, the biasing member may be a disc spring provided from a side surface of the ring-shaped member opposite from the motor rotator to a side surface of the bush opposite from the motor rotator.

As a result, a ring-shaped space surrounded by the disc spring, the inner periphery of the ring-shaped member and the outer periphery of the bush and the space, is formed and the ring-shaped space can be used as an oil chamber.

Furthermore, a contact surface of the bush and a side surface of the wall surface that contact each other may be hardened.

As a result, it is possible to suppress wear caused by friction in contact surfaces of the bush and the wall surface.

Moreover, the damper unit may cover an end of the rotation shaft opposite from the motor rotator to form an oil chamber filled with oil inside.

As a damper, a bush, and a roller bearing are not needed, the present invention is achievable with fewer components.

Advantageous Effects

According to the present invention, it is possible to provide the shaft supporting structure of the shaft supporting structure for the electric supercharger having the electric motor overhanging outside the bearing, which is easy to assembly and capable of reducing the shaft vibration, which does not require bearings of particular configurations and which is easily achievable by altering the existing devices.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

EMBODIMENTS

First Embodiment

Figure 1:
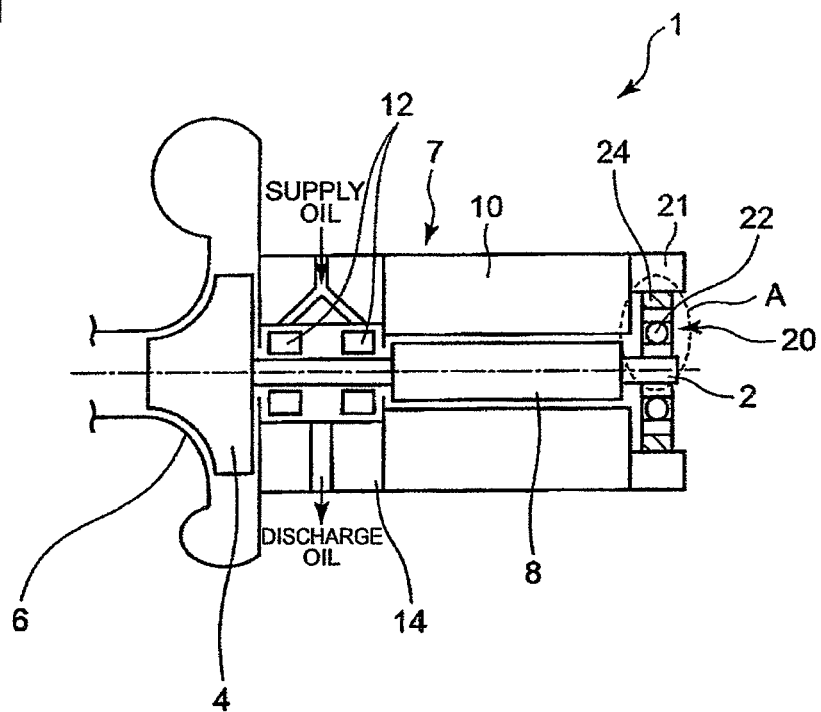
FIG. 1 is a schematic illustration of a shaft supporting structure for an electric supercharger in relation to a first embodiment.

FIG. 1 is a schematic illustration of a shaft supporting structure for an electric supercharger in relation to a first embodiment.

In the shaft supporting structure for the electric supercharger 1 in relation to the first embodiment shown in FIG. 1, a rotation shaft 2 extends outside a compressor wheel 4 attached to the rotation shaft 2. A compressor cover 6 covers the compressor wheel 4, etc.

A motor rotator 8 and a motor 10 are provided on an extended part of the rotation shaft 2 extending outside the compressor wheel 4.

The motor rotator 8 is a rotator of the electric supercharger. The motor rotator 8 is securely installed to the rotation shaft 2 to rotate with the rotation shaft 2. The motor 10 surrounds the motor rotator 8. The motor 10 is a stator for applying torque to the motor rotator 8. An electric motor 7 is formed by the motor rotator 8 and the motor 7.

A bearing 12 is provided on one side of the motor rotator 8 of the electric motor 7, the side being on a compressor wheel 4 side, i.e. nearer to the compressor wheel 4. More specifically, in the shaft supporting structure for the electric supercharger shown in FIG. 1, the bearing 12 is configured to support one side of the motor rotator 8 so that the motor rotator 8 overhangs from the bearing 12.

A bearing housing 14 houses the bearing 12. The bearing housing 14 is configured so that oil is supplied to an interior and is drained to an exterior of the bearing housing 14.

Further, a damper unit 20 is provided to absorb vibration of the rotation shaft 2. The damper unit 20 is formed by a ring member 21 in a shape of a ring, provided on an opposite side of the motor 10 from the compressor wheel 4 and around the rotation shaft 2, and a damper 24 and a roller bearing 22 that are provided on an inner side of the ring member 21.

The ring member 21 is provided to support the damper 24 in a radial direction of the rotation shaft 2. The ring member 21 may be attached to the motor 10, a casing of the motor 10, a compressor casing (not shown) for covering the entire supercharger, or the like.

Further, a general roller bearing may be used as the roller bearing 22. Furthermore, the roller bearing 22 may be a grease-filled roller bearing that is filled with grease.

The damper 24 is not particularly limited as long as it has damping effect. For instance, a rubber sheet or a rubber O-ring may be used as the damper 24. Further, an oil film damper may be used as the damper 24.

Figure 2:
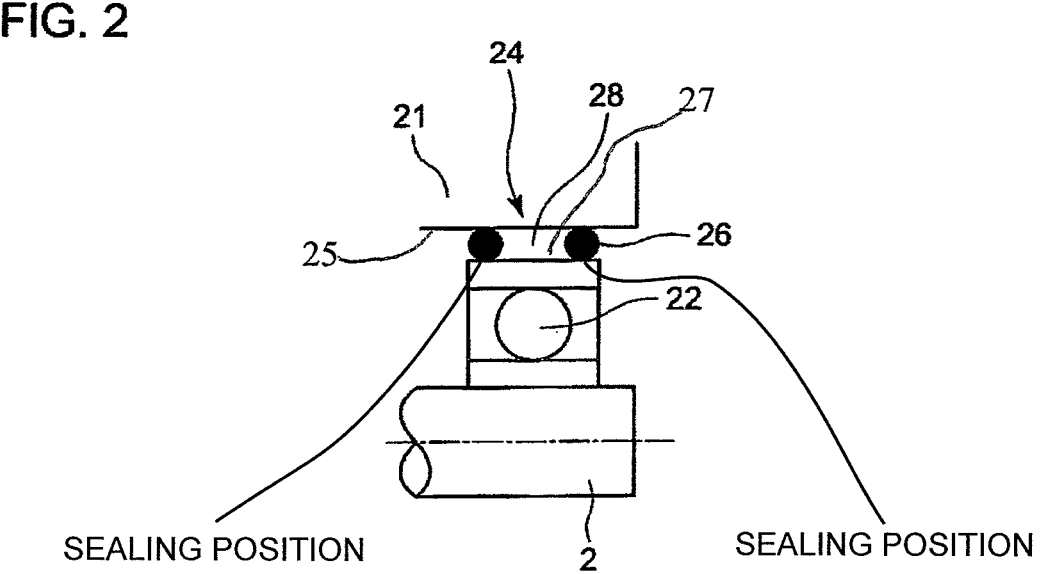
FIG. 2 is an enlarged view of a section A of FIG. 1.

The damper unit 20 is further described in reference to FIG. 2.

FIG. 2 is an enlarged view of a section A of FIG. 1 in which an oil film damper is used as the damper 24.

The grease-filled roller bearing 22 is provided at a shaft end of the rotation shaft 2 on a motor-rotator side. Then, the oil film damper 24 is provided on an outer periphery of the greased-filled roller bearing 22. The oil film damper 24 is formed by a seal 26 and an oil enclosure part 28.

A pair of the seals 26 is provided in two ends of the grease-filled roller bearing 22 in the axial direction of the rotation shaft 2 along the outer periphery 27 of the grease-filled roller bearing 22. For instance, a rubber O-ring or the like may be used as the seal 26. The outer periphery of the seal 26 contacts the inner periphery 25 of the ring member 21.

By providing the seals 26 in the above manner, formed is a ring-shaped space surrounded by the pair of seals 26, the outer periphery 27 of the grease-filled roller bearing 22 and the inner periphery 25 of the ring member 21. The surrounded ring-shaped space functions as the oil enclosure part 28 for enclosing the oil within. As a result, the damper 24 is formed by the seals 26 and oil enclosure part 28 enclosing the oil.

According to the shaft supporting structure for the electric supercharger of the first embodiment, the motor rotator 8 overhangs from the bearing (the bearing 12) as shown in FIG. 1, the shaft supporting structure for the electric supercharger can be easily assembled. With the damper unit 20 for absorbing the vibration of the rotation shaft 2, the shaft vibration can be suppressed. Further, the present embodiment is achievable by providing the damper unit 20 at the end of the rotation shaft 2 without using parts of special configurations. Thus, the present embodiment is easily achievable by altering the existing devices.

In the embodiment shown in FIG. 1 and FIG. 2, if the greased-filled roller bearing is not used as the roller bearing 22, lubricating oil needs to be supplied to the roller bearing and it requires a piping structure for supplying the lubricating oil. Therefore, for the purpose of reducing the size of the overall unit, the grease-filled roller bearing is used as the roller bearing 22.

Second Embodiment

Figure 3:
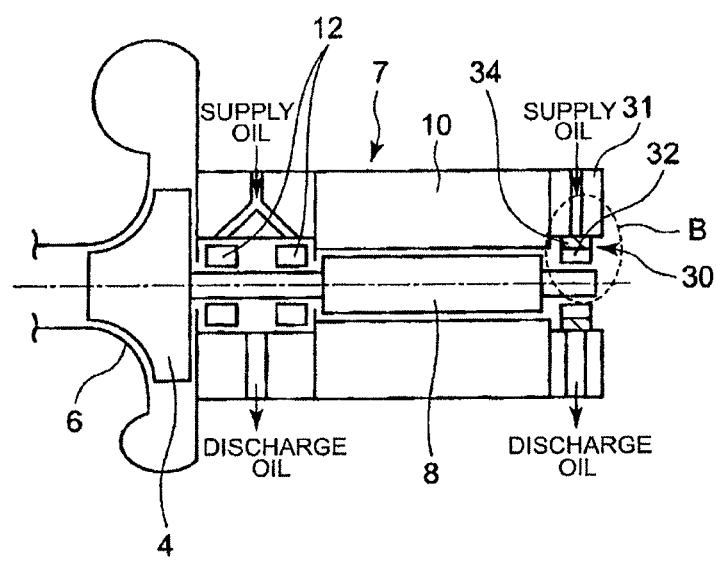
FIG. 3 is a schematic illustration of the shaft supporting structure for the electric supercharger in relation to a second embodiment.

FIG. 3 is a schematic illustration of the shaft supporting structure for the electric supercharger in relation to a second embodiment.

The same reference numerals are given without adding explanations for those configurations that are the same as FIG. 1.

A damper unit 30 is shown in FIG. 3. The damper unit 30 has different structure from the damper 20 of FIG. 1.

The damper unit 30 is provided on the opposite side of the motor rotator 8 from the compressor wheel 4 in a manner similar to the damper 20 shown in FIG. 1. Further, the damper unit 30 is formed by a ring member 31 around the rotation shaft 2, and a damper 34 and a bush 32 that are provided on an inner side of the ring member 31.

The ring member 31 and the damper 34 are configured substantially the same as the ring member 21 and the damper 24.

Further, a general bush may be used as the bush 32 and an oil supply hole 33 is provided. The oil supply hole 33 is described later.

Figure 4:
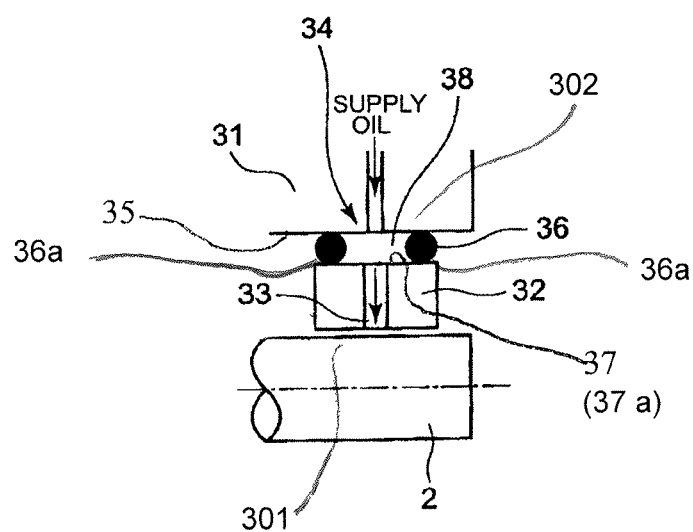
FIG. 4 is an enlarged view of a section B of FIG. 3.

The damper unit 30 is described in reference to FIG. 4.

FIG. 4 is an enlarged view of a section B of FIG. 3. In the case shown in the section B, an oil film damper is used as the damper 34.

The bush 32 is provided at the shaft end of the rotation shaft 2 on the motor-rotator side. The bush 32 is provided with a space (a first ring shape space 301) between the bush 32 and the rotation shaft 2. Further, an oil film damper 34 is provided at the outer periphery 37 of the bush 32. The oil film damper 34 is formed by a seal 36 and an oil enclosure part 38. The seals 36 are provided on each side of the oil supply hole 33 on the largest outer diameter portion 37a of the outer periphery 37 of the bush 32, such that an inner periphery 36a of the seal 36 opposes the largest outer diameter portion 37a.

Herein, the oil film damper 34 formed by the seal 36 and the oil enclosure part 38 is substantially the same as the oil film damper 24 formed by the seal 26 and the oil enclosure part 28. Namely, formed is a ring-shaped space (a second ring shape space 302) surrounded by the pair of seals 36, an outer periphery 37 of the bush 32 and an inner periphery 35 of the ring member 31. The surrounded ring-shaped space (a second ring shape space 302) functions as the oil enclosure part 38 for enclosing the oil within. As a result, the damper 34 is formed by the seals 36 and the oil enclosure part 38 enclosing the oil.

The positions of the oil supply hole 33 and the oil enclosure part 38 are adjusted to arrange the oil film damper 34 and the bush so that the oil enclosure part 38 communicates with the inner periphery of the bush 32 via the oil supply hole 33 formed in the bush 32. As a result, it is possible to supply the oil supplied to the oil enclosure part 38 to the inner periphery of the bush 32 as lubricating oil.

In FIG. 4, the oil film damper 34 is used as the damper 34. However, the damper is not limited to this and a damper made of elastic material such as a rubber sheet and a rubber O-ring may be used as the damper 34. In such case, the damper 34 is formed with a through-hole or the like to supply the lubricating oil to the oil supply hole 33 of the bush 32.

According to the shaft supporting structure for the electric supercharger of the second embodiment, the motor rotator 8 overhangs from the bearing (the bearing 12) as shown in FIG. 3 and thus the shaft supporting structure for the electric supercharger can be easily assembled. With the damper unit 30 for absorbing the vibration of the rotation shaft 2, the shaft vibration can be suppressed. Further, the present embodiment is achievable simply by providing the damper unit 30 at the end of the rotation shaft 2 without using parts of a special configuration. Thus, the present embodiment is easily achievable by altering the existing devices.

Figure 7:
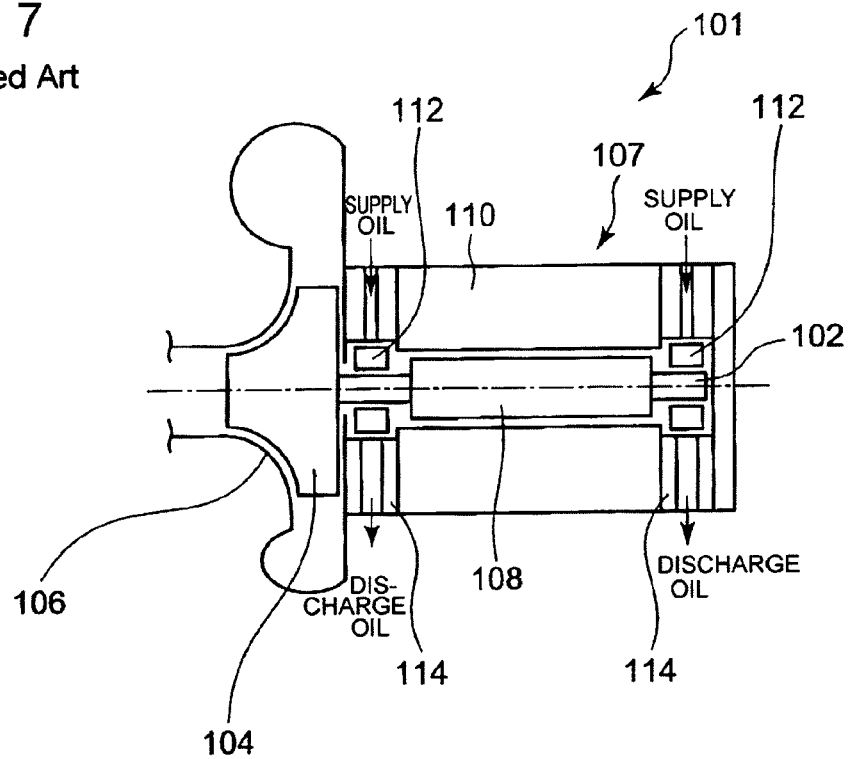
FIG. 7 is a schematic illustration of one example of a conventional shaft supporting structure for the electric supercharger.
Figure 8:
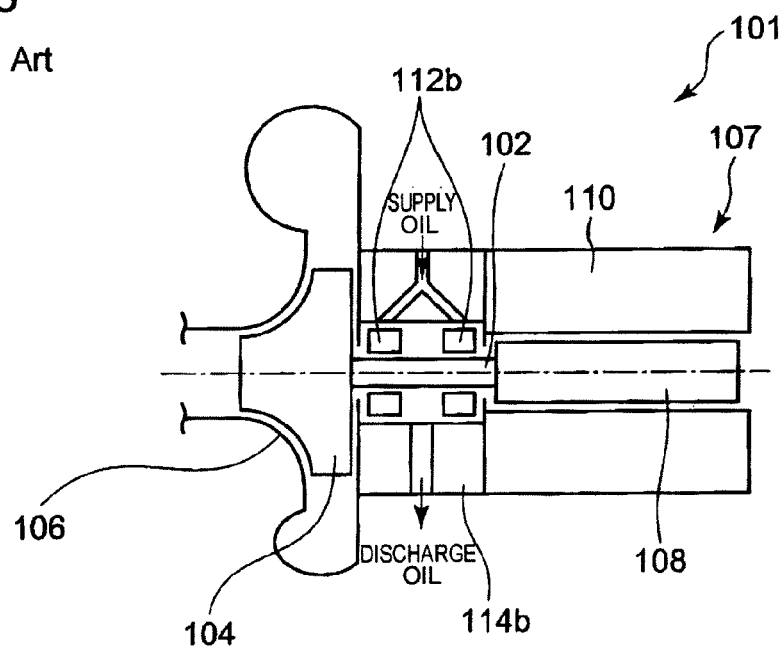
FIG. 8 is a schematic illustration of another example of the conventional shaft supporting structure for the electric supercharger.

With use of the bush 32, equipments such as piping for supplying the oil is needed but the overall size of the damper unit 30 can be reduced. Further, in comparison with the case of using the roller bearing described in the first embodiment, the structure possesses higher reliability regarding its life. Furthermore, the bush 32 used as the damper and the bearing have similar arrangement with respect to the rotation shaft 2 but the bush 32 may have a greater space between the bush 32 and the rotation shaft 2 than the bearing 12, which is required to maintain rotation precision, so as to be specialized in damping characteristics. Therefore, ease of assembly is improved compared to the conventional case shown in FIG. 7 in which the motor rotator 108 is supported at both ends.

Third Embodiment

A third embodiment has a damper unit with a different structure from the damper units of the first and second embodiments.

As the structure other than the damper unit is substantially the same as FIG. 1 and thus the same reference numerals are given without adding explanations for those configurations that are the same as FIG. 1.

Figure 5:
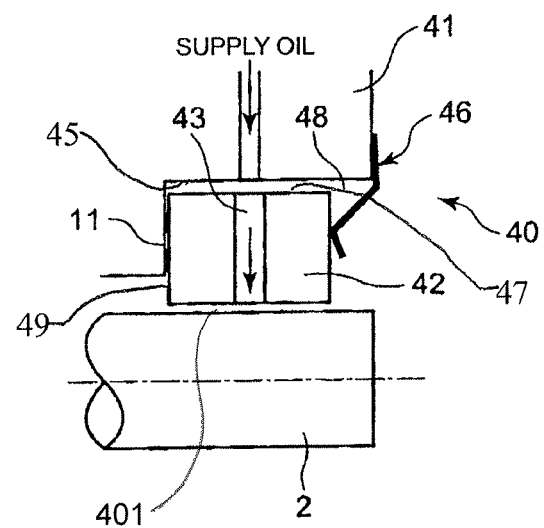
FIG. 5 is a schematic diagram of a damper unit in relation to a third embodiment.

A damper unit 40 in relation to the third embodiment is described in reference to FIG. 5.

FIG. 5 is a schematic diagram of the damper unit 40 in relation to the third embodiment.

The damper unit 40 is formed by a ring member 41 around the rotation shaft 2, and a bush 42 provided on an inner side of the ring member 41, and a spring 46.

The ring member 41 is substantially the same as the ring members 21, 31 shown in FIG. 1 to FIG. 4.

As the bush 42, a general bush may be used and an oil supply hole 43 is provided. The bush 42 is provided around the rotation shaft 2 with a first space 401 between the bush 42 and the rotation shaft 2;

Further, a wall surface 11 is provided such as to face a side surface 49 of the bush 42 on the motor-rotator side. The casing wall surface of the motor 10 or the like may be used as the wall surface 11.

The spring 46 operates to press the bush against the wall surface 11. More specifically, the spring 46 applies load to the bush 42 from the wall surface 11 so as to apply load between the bush 42 and the wall surface 11.

By using a disc spring as the spring 46 (the disc spring of a circular ring shape configured to seal a second space 48 and an inner circumferential end of the disc spring is bent to bias the bush side surface 49), the spring 46 also functions as a seal so as to enclose the oil in the second space 48 (a space formed by an outer periphery 47 of the bush 42, the wall surface 11, an inner periphery 45 of the ring member 45 and the spring 46 (the disc spring)). In this case, the second space 48 communicates with the inner periphery of the bush 42 via the oil supply hole 43 formed in the bush 42 so as to supply the oil supplied to the second space 48 to the inner periphery of the bush 42 as lubricating oil.

With the above configuration, a friction damper is formed for absorbing the shaft vibration of the rotation shaft 2 using a frictional force between the bush 42 and the wall surface 11.

To suppress wear in contact surfaces of the bush 42 and the wall surface 11 as well as contact surfaces of the bush 42 and the spring 46, each of the contact surfaces may be treated.

One method of treating the contact surfaces, the contact surfaces may be hardened. More specifically, iron-based material may be treated by quenching, nitriding, carburizing, or hard thin film (diamond-like carbon, CrN, TiN or the like) and copper-based or aluminum-based material may be treated by hard thin film.

Another method of treating the contact surfaces is coating by solid lubricant. As the solid lubricant, PTFE (polytetrafluoroethylene), graphite, molybdenum disulfide or the like may be used.

Further, the above-described surface-hardening and the coating by the lubricant may be combined. More specifically, the contact surface may be hardened and then coated by the solid lubricant.

According to the shaft supporting structure for the electric supercharger of the third embodiment, the motor rotator 8 overhangs from the bearing (the bearing 12) and thus the shaft supporting structure for the electric supercharger can be easily assembled. With the damper unit 40 for absorbing the vibration of the rotation shaft 2, the shaft vibration can be suppressed. Further, the present embodiment is achievable simply by providing the damper unit 40 at the end of the rotation shaft 2 without using parts of a special configuration. Thus, the present embodiment is easily achievable by altering the existing devices.

Moreover, with use of the friction damper shown in FIG. 5 as the damper unit 40, the damping effect is improved. Further, the bush 42 is prevented from moving in the thrust direction by a simple structure using the spring 46 and the wall surface 11.

Fourth Embodiment

Figure 6:
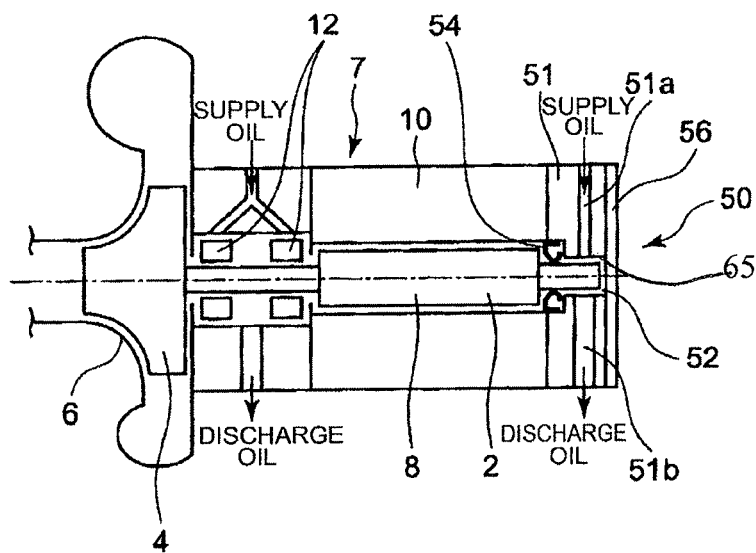
FIG. 6 is a schematic illustration of the shaft supporting structure for the electric supercharger in relation to a fourth embodiment.

FIG. 6 is a schematic illustration of the shaft supporting structure for the electric supercharger in relation to a fourth embodiment.

The same reference numerals are given in FIG. 6 without adding explanations for those configurations that are the same as FIG. 1.

In FIG. 6, a damper unit 50 having a different structure from the damper 20 described in FIG. 1 is provided.

The damper unit 50 forms an oil chamber 52 by a ring member 51 surrounding the rotation shaft 2 in the radial direction, an oil seal 54 and a cover 56. More specifically, the shaft end of the rotation shaft 2 is disposed inside the oil chamber 52. The oil chamber 52 may be supplied with oil from an oil supply hole formed in the ring member 51 and the supplied oil may be drained from a oil drain hole 51b formed in the ring member 51. Further, the oil chamber 52 may be filled with oil when the electric supercharger 1 is used.

According to the above configuration, the damper unit 50 functions as a squeeze film damper by sufficiently reducing a space in the radial direction between the wall surface of the oil chamber 52 (the inner periphery 55 of the ring member 51) and the shaft end of the rotation shaft 2 and also functions as a viscous friction damper by sufficiently reducing a space in the axial direction between the cover 56 of the oil chamber 52 and the shaft end.

Further, a mechanism for adjusting these spaces may be provided to adjust the space in the radial direction between the wall surface of the oil chamber 52 and the space in the axial direction between the cover 56 of the oil chamber 52 and the shaft end. In this case, it is possible to adjust damping capability of the damping unit 50.

According to the shaft supporting structure for the electric supercharger of the fourth embodiment, the motor rotator 8 overhangs from the bearing (the bearing 12) as shown in FIG. 6, and thus the shaft supporting structure for the electric supercharger can be easily assembled. With the damper unit 50 for absorbing the vibration of the rotation shaft 2, the shaft vibration can be suppressed. Further, the present embodiment is achievable simply by providing the damper unit 50 at the end of the rotation shaft 2 without using parts of a special configuration. Thus, the present embodiment is easily achievable by altering the existing devices.

Moreover, this embodiment is achievable with fewer parts as the damper, the bush, and the roller bearing are not needed.

INDUSTRIAL APPLICABILITY

In the shaft supporting structure for the electric supercharger in which the motor unit overhangs from the bearing, the shaft supporting structure for the electric supercharger is easy to assemble and capable of suppressing the shaft vibration and is applicable to existing devices without using bearings of special configurations.

The invention claimed is:

1. A rotation shaft supporting structure for an electric supercharger, comprising:
   a rotation shaft to which a compressor wheel is attached, the compressor wheel being a wheel of a supercharging side;
   an electric motor comprising a motor rotator securely installed to the rotation shaft, and a stator for applying a torque to the motor rotator;
   a bearing for supporting the rotation shaft, the bearing being provided on a bearing side end of the rotation shaft which is adjacent to the compressor wheel; and
   a damper unit for absorbing a shaft vibration of the rotation shaft, the damper unit being provided at a shaft end on an opposite side to the bearing side end,
   wherein the damper unit comprises:
   a bush provided around the rotation shaft with a first space between the bush and the rotation shaft;
   a ring-shaped member provided around the bush with a second space between the ring-shaped member and the bush, the ring-shaped member having a wall surface facing a side surface of the bush on a motor rotator side;
   a biasing member for biasing the bush against the wall surface; and
   an oil enclosure part configured to enclose oil in the second space defined by an outer periphery of the bush, the wall surface, an inner periphery of the ring-shaped member and the biasing member, and
   wherein the bush has an oil supply hole for supplying a lubricating oil to the first space between the bush and the rotation shaft from outside of the bush,
   wherein the biasing member is a disc spring provided from a side surface of the ring-shaped member opposite from the motor rotator to a side surface of the bush opposite from the motor rotator, and
   wherein the disc spring includes:
   a fix portion configured to be fixed to the side surface of the ring-shaped member; and
   a bent portion formed at an inner circumferential side of the fix portion, the bent portion having a bent edge configured to bias the side surface of the bush, the fix portion and the bent portion being integrally formed.

2. The rotation shaft supporting structure for the electric supercharger according to claim 1,
   wherein a contact surface of the bush and a surface of the wall surface that contact each other are hardened.

* * * * *